United States Patent [19]
Egawa et al.

[11] Patent Number: 5,947,663
[45] Date of Patent: Sep. 7, 1999

[54] HORIZONTAL HOBBING MACHINE

[75] Inventors: Tsuneo Egawa; Yozo Nakamura; Toshikazu Kominami; Yoshiharu Tonohara, all of Kurita-gun, Japan

[73] Assignee: Mitsubishi Heavy Industries, Ltd., Tokyo, Japan

[21] Appl. No.: 09/141,576

[22] Filed: Aug. 28, 1998

[30] Foreign Application Priority Data

Aug. 29, 1997 [JP] Japan ..................................... 9-233443

[51] Int. Cl.$^6$ .............................. B23C 9/00; B23F 23/00
[52] U.S. Cl. .................................... 409/137; 29/DIG. 61; 29/DIG. 73; 29/DIG. 101; 409/11
[58] Field of Search ..................................... 409/137, 134, 409/11, 10, 1, 6, 50, 25, 38; 29/DIG. 16.61, DIG. 16.73, DIG. 16.94, DIG. 16.1, DIG. 16.101, DIG. 16.102

[56] References Cited

U.S. PATENT DOCUMENTS

| | | | |
|---|---|---|---|
| 1,143,570 | 6/1915 | Burgess | 409/11 |
| 5,205,806 | 4/1993 | Ishida et al. | 483/18 |
| 5,586,848 | 12/1996 | Suwijn | 409/137 |
| 5,611,137 | 3/1997 | Braun | 29/26 A |
| 5,813,806 | 9/1998 | Muller | 409/11 |

FOREIGN PATENT DOCUMENTS

| | | |
|---|---|---|
| 58-150426 | 10/1983 | Japan . |
| 5023947 | 2/1993 | Japan ..................................... 409/137 |

*Primary Examiner*—William Briggs
*Attorney, Agent, or Firm*—Birch, Stewart Kolasch & Birch, LLP

[57] ABSTRACT

A horizontal hobbing machine comprises a bed, a cutting section provided on the bed and including at least a horizontal rotary shaft and a hob. The cutting section generates a tooth form on a work piece supported around the rotary shaft by means of the hob. A conveyor is provided in a lower part of the cutting section below the bed to remove chips of the work piece resulting from the cutting process.

8 Claims, 12 Drawing Sheets

HORIZONTAL HOBBING MACHINE

BACKGROUND OF THE INVENTION

The present invention relates to a horizontal hobbing machine for cutting a tooth form on a work piece supported around a central shaft provided substantially horizontal.

A hobbing machine for machining a gear by cutting is a typical machine tool for machining a gear. Hobbing machines are classified into a vertical hobbing machine for cutting a tooth form in a work piece supported around a central shaft provided substantially vertical, and a horizontal hobbing machine for cutting a tooth form in a work piece supported around a central shaft provided substantially horizontal.

An example of the conventional horizontal hobbing machine will now be described with reference to FIGS. 1 to 3. As is shown in FIGS. 1 to 3, a headstock 2 and a tailstock 3 are slidably supported on a bed 1. A work piece 4 is rotatably supported around a horizontally situated shaft between the headstock 2 and tailstock 3.

On the other hand, a saddle 5 is slidably supported on the bed 1. A head 6 is supported on the saddle 5. A hob 7 of a high speed tool steel is supported on the head 6. The hob 7 is rotated by a main shaft motor 8.

The head 6 is provided with a coolant nozzle 9. A coolant is supplied to a cutting section from the coolant nozzle 9. A chip exhaust groove 10 is provided on the bed 6. The groove 10 is provided with an exhaust port 11 inclined rearward of the present machine (horizontal hob machine: bed 1). Controls necessary for generating a tooth form, e.g. rotation of work 4, rotation and radial feed of hob 7, etc., are effected on the basis of commands from a control board 12.

In the above-described hobbing machine, while the work piece 4 is being rotated, the hob 7 is driven by the main shaft motor 8. The hob 7 and work piece 4 are thus engaged and a tooth form is generated on an outer periphery of the work piece 4. In this case, the rotating hob 7 is radially fed to the work piece 4 by sliding the saddle 5, thereby generating a predetermined tooth form on the work piece 4.

During the cutting process, a coolant is supplied to the cutting section from the coolant nozzle 9, thus lubricating and cooling the cutting section and washing away produced cut chips. The chips washed away with the coolant from the cutting section flow through the chip exhaust groove 10 on the bed 1 along with the coolant, and is drained out of the machine (horizontal hob machine: bed 1) from the exhaust port 11 to be recovered.

In the field of hobbing machines, too, various improvements have been made in order to enhance productivity and to reduce manpower. In addition, in these years, there is a demand for taking measures to protect the environment.

A measure for protecting the environment in the field of hobbing machines is a so-called "dry-cutting" process in which cutting is performed without using a coolant. The use of the coolant not only deteriorates the working environment due to malodor or dispersion, but also causes air pollution due to treatment of waste oil.

The main problems to be solved in adopting the dry-cutting process in the field of hobbing machines are wear of the hob and disposal of chips. The wear of the hob can be reduced, for example, by substituting a hob of cemented carbide for the hob 7 of high speed tool steel.

As regards the disposal of chips, however, there is no satisfactory measure, and this is the most serious problem in the dry-cutting process. If the coolant is used, the chips are washed away with the coolant and exhausted out of the machine (horizontal hobbing machine: bed 21). In the dry-cutting process using no coolant, however, chips will remain and accumulate in respective parts of the hobbing machine. Consequently, the chips will be caught among the sliding parts or operating parts of the hobbing machine, and normal operations will be hindered. Moreover, heat of chips is transmitted to the respective parts of the hobbing machine, resulting in thermal deformation and deterioration in machining precision.

The object of the present invention is to provide a horizontal hobbing machine capable of efficiently disposing of chips even in the dry-cutting process.

BRIEF SUMMARY OF THE INVENTION

The object of the invention is achieved by a horizontal hobbing machine comprising a bed; a cutting section provided on the bed and including at least a horizontal rotary shaft and a hob, the cutting section generating a tooth form on a work piece supported around the rotary shaft by means of the hob; and a conveyor provided in a lower part of the cutting section below the bed.

According to this horizontal hobbing machine, no coolant is supplied to the cutting section during the cutting process, and a tooth form is generated by dry-cutting. Chips produced by the cutting drop onto the conveyor by their own weight. The chips which have dropped are conveyed by the conveyor and exhausted, for example, out of the machine.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a presently preferred embodiment of the invention and together with the general description given above and the detailed description of the preferred embodiment given below, serve to explain the principles of the invention.

DETAILED DESCRIPTION OF THE INVENTION

Preferred embodiments of a horizontal hobbing machine according to the present invention will now be described with reference to the accompanying drawings.

Figure 1:
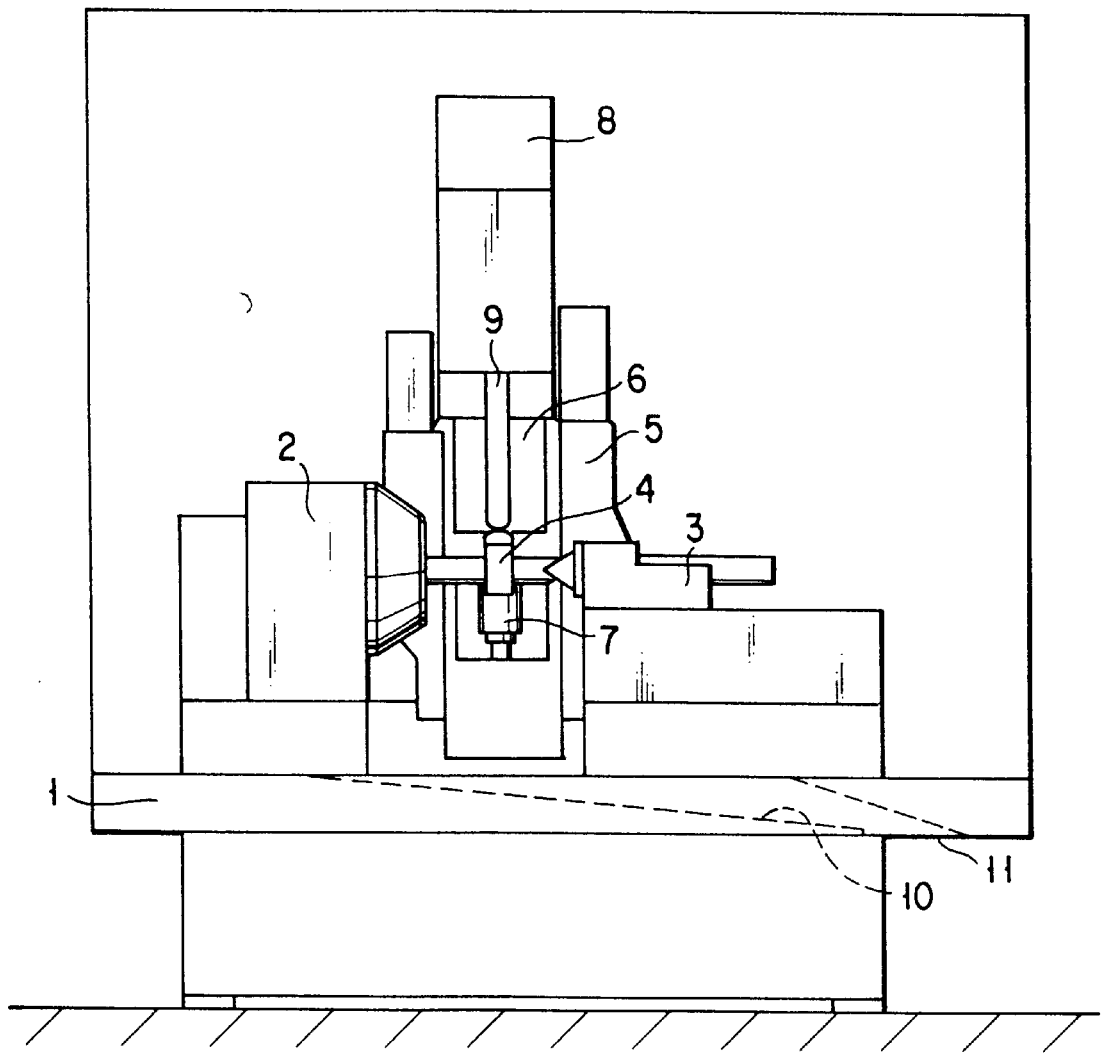
FIG. 1 is a front view of a conventional horizontal hobbing machine.
Figure 2:
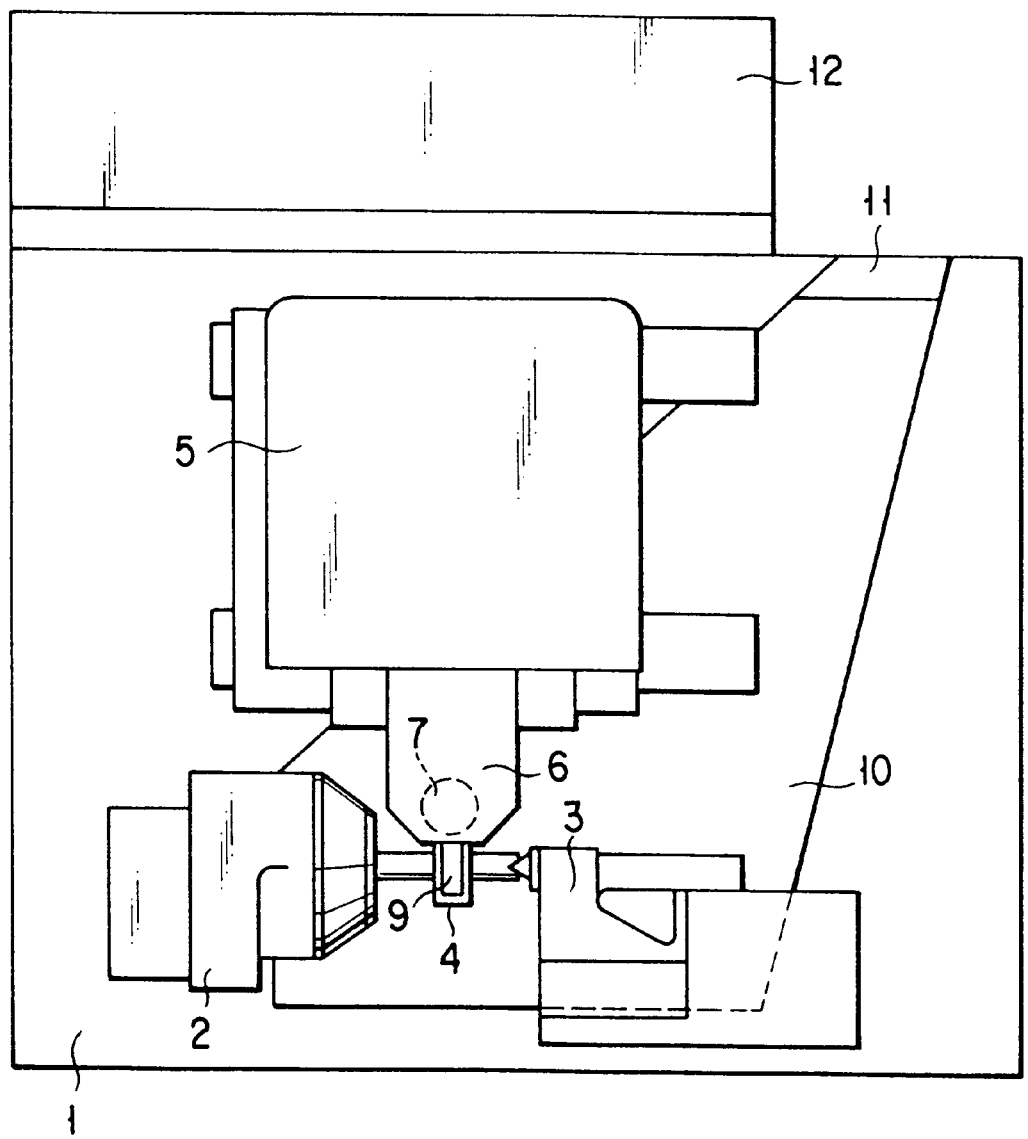
FIG. 2 is a plan view of the conventional horizontal hobbing machine.
Figure 3:
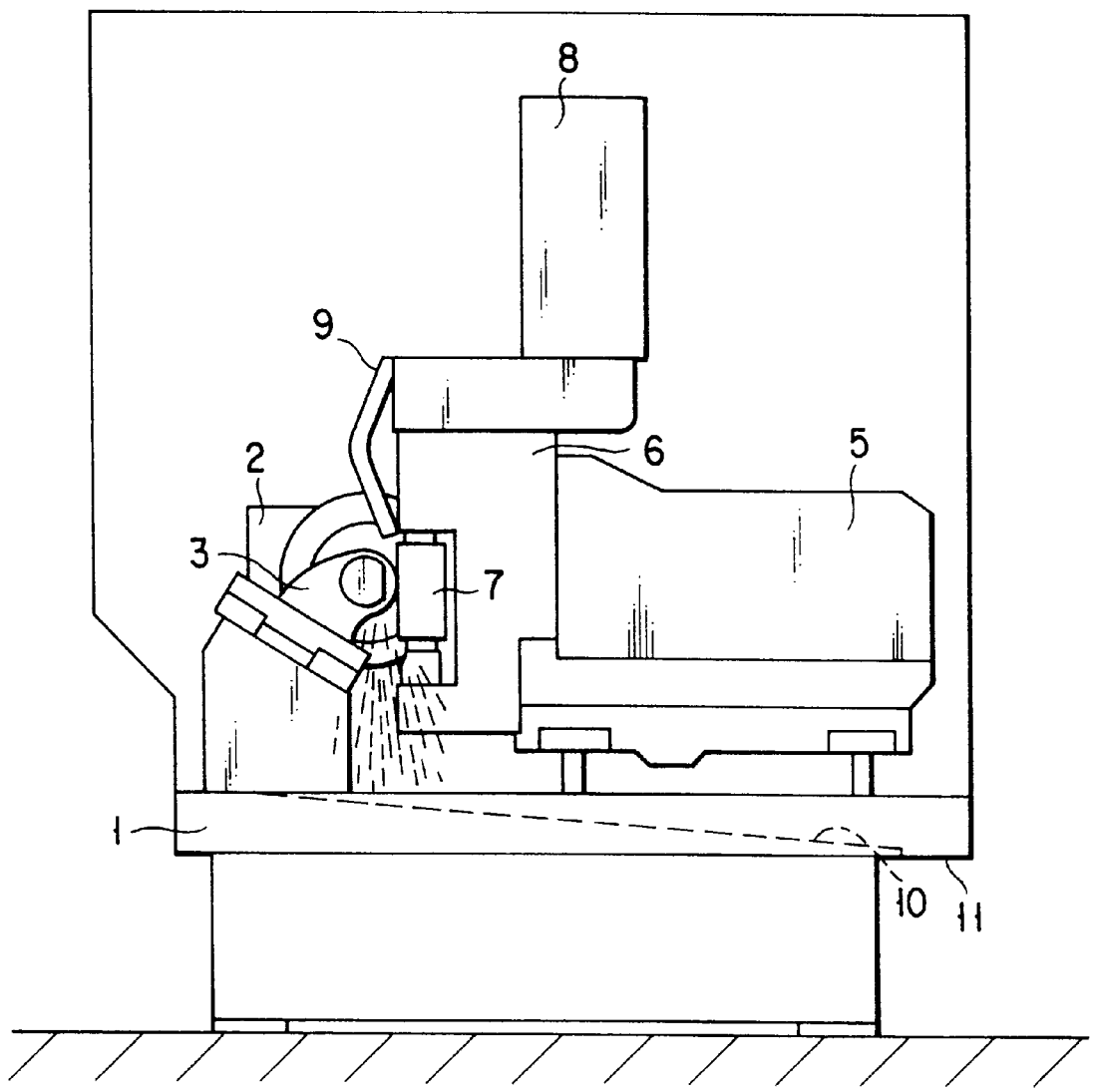
FIG. 3 is a side view of the conventional horizontal hobbing machine.
Figure 4:
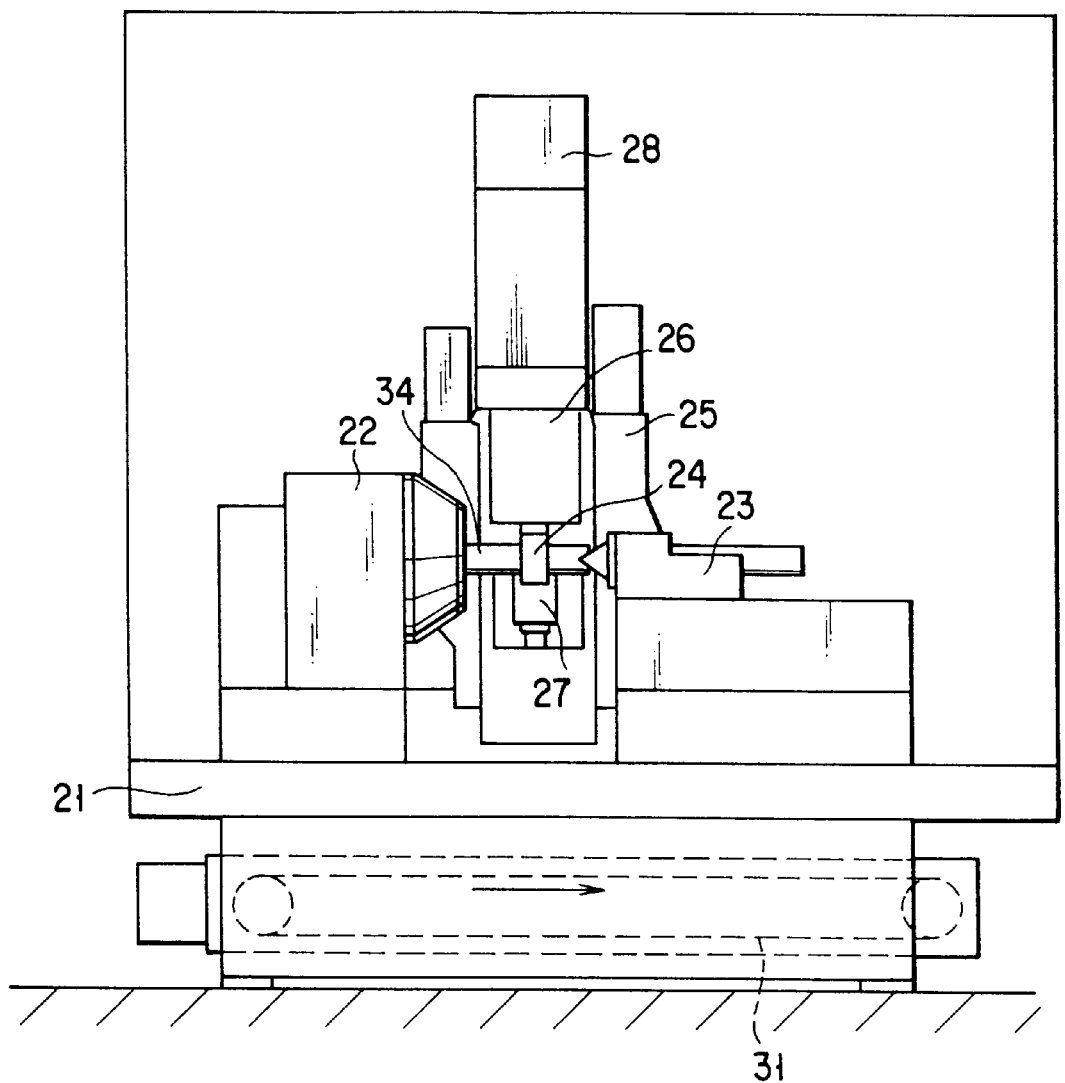
FIG. 4 is a front view of a horizontal hobbing machine according to a first embodiment of the present invention.
Figure 5:
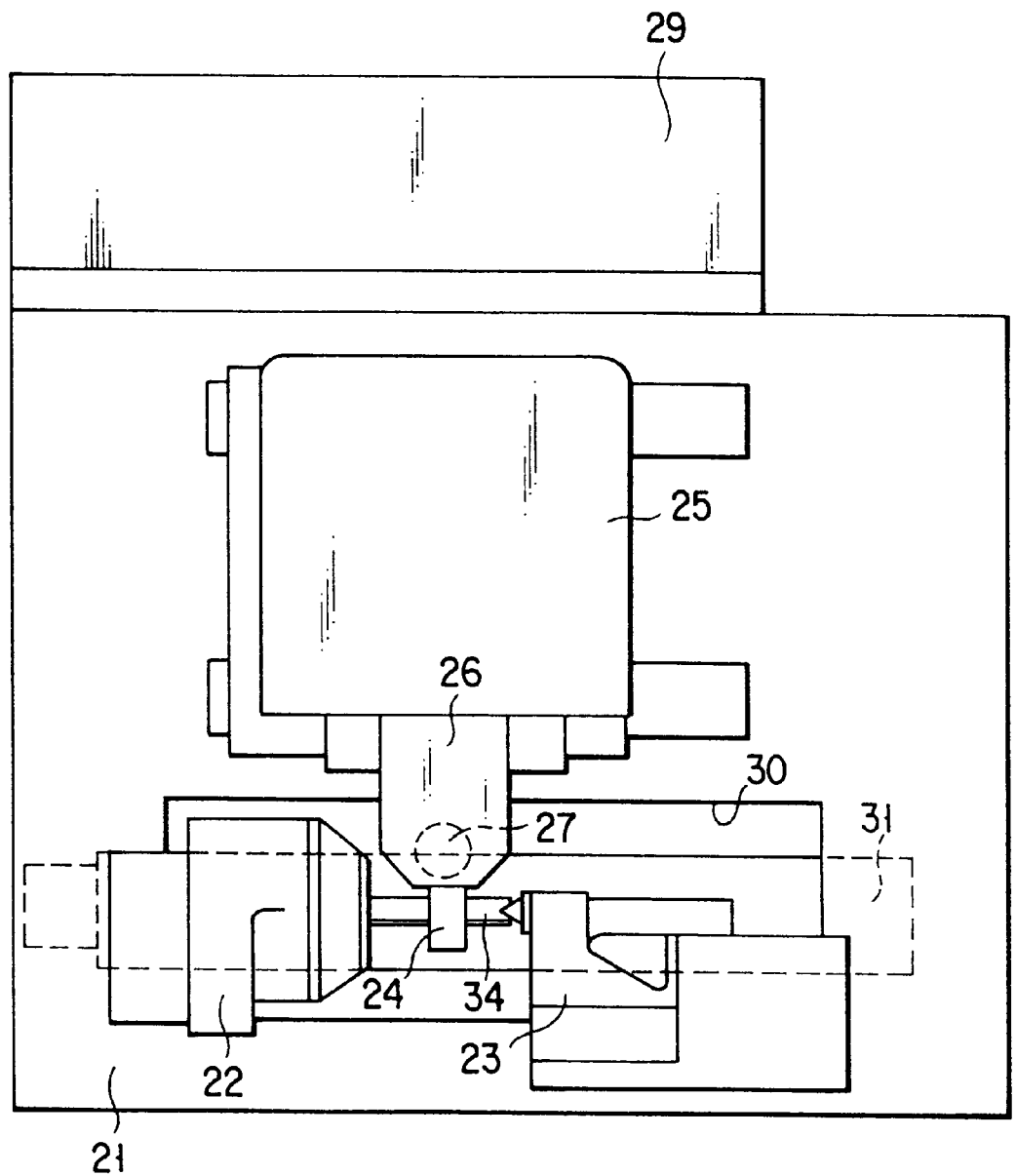
FIG. 5 is a plan view of the horizontal hobbing machine according to the first embodiment of the invention.
Figure 6:
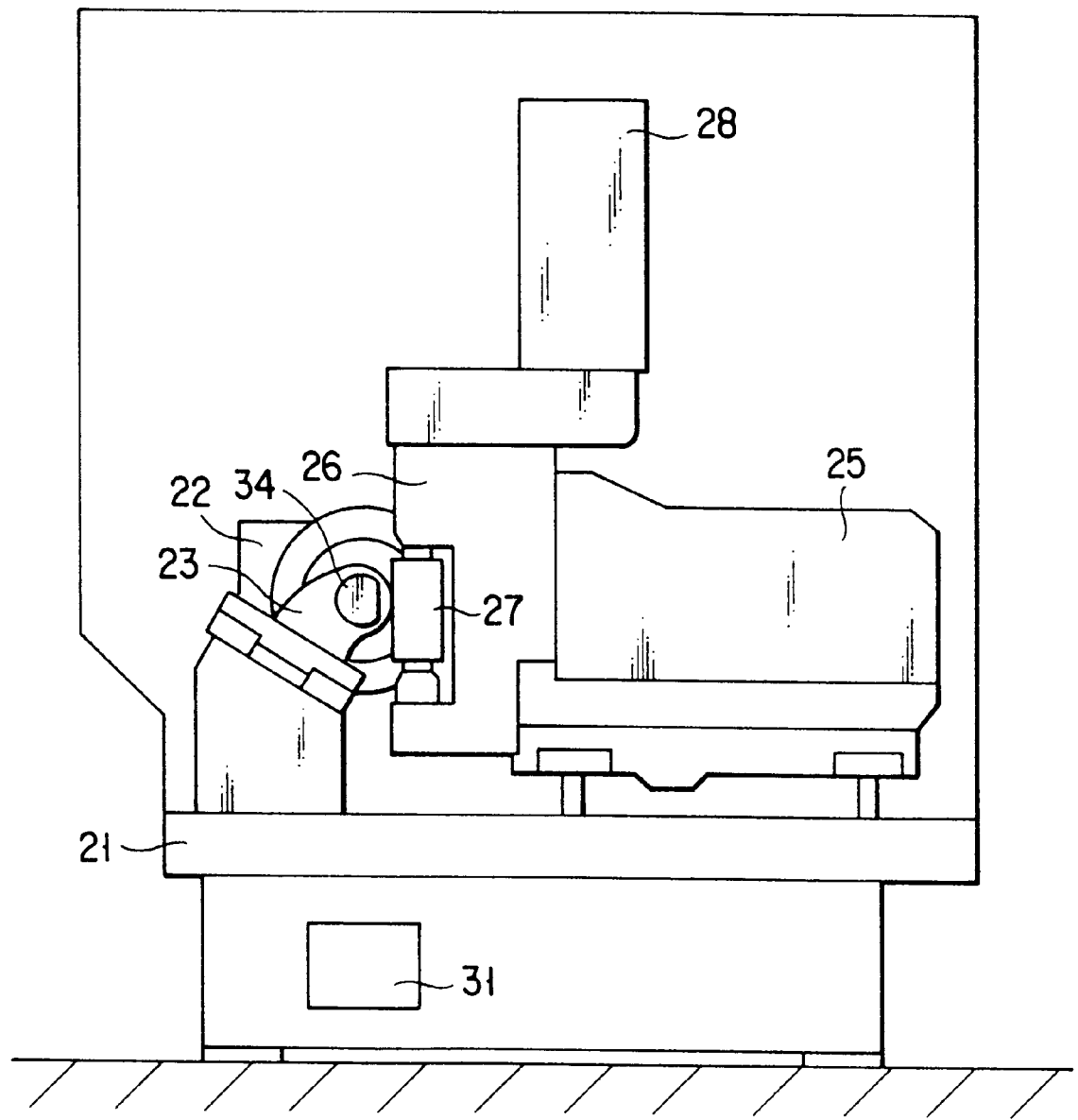
FIG. 6 is a side view of the horizontal hobbing machine according to the first embodiment of the invention.

As is shown in FIGS. 4 to 6, a cutting unit is disposed on the bed 21. The cutting unit includes at least a horizontal rotary shaft 34 and a hob 27. The cutting unit generates a tooth form on the work piece 24 supported around the rotary shaft 34 by means of the hob 27. The cutting unit also comprises a headstock 22, a tailstock 23, a saddle 25, a head 26, and a main shaft motor 28.

The cutting unit will now be described. The headstock 22 and tailstock 23 are slidably supported on the bed 21. The work piece 24 is rotatably supported around the horizontal rotary shaft 34 between the headstock 22 and tailstock 23.

On the other hand, the saddle 25 is slidably supported on the bed 21. The head 26 is supported on the saddle 5. The hob 27 possibly constructed of cemented carbide, is supported on the head 26. The hob 27 is rotated by the main shaft motor 28. Controls necessary for generating a tooth form, e.g. rotation of work piece 24, rotation and radial feed of hob 27, etc., are effected on the basis of commands from a control board 29.

An opening 30 is formed in the bed 21 in a region below the cutting unit where chips drop. A chip conveyor 31 is provided below the cutting unit including the opening 30. The chip conveyor 31 is moved in a direction along the rotational axis of the work piece 24 (an axis of the rotary shaft 34), i.e. in the rightward direction (direction of arrow) in FIGS. 4 and 5.

In the present machine of the invention, i.e. the horizontal hobbing machine, a front side and a rear side thereof are defined. The front side of the machine is a side on which the headstock 22 and tailstock 23 of the cutting unit are disposed on the bed 21, and the rear side of the machine is a side on which the saddle 25 and control board 29 are disposed on the bed 21 and a maintenance space (not shown) is provided.

In the above-described hobbing machine, while the work piece 24 is being rotated, the hob 27 is driven by the main shaft motor 28. The hob 27 and work piece 24 are thus engaged and a tooth form is generated on an outer periphery of the work piece 24. In this case, the rotating hob 27 is radially fed to the work piece 24 by sliding the saddle 25, thereby generating a predetermined tooth form on the work 24.

During the cutting machining, no coolant is supplied to the cutting unit, and the tooth form is generated by dry-cutting. All chips produced by the cutting drop on the conveyor 31 through the opening 30 by their own weight. The chips which have dropped are conveyed in a direction along the rotational axis of the work piece 24 (the axis of the rotary shaft 34), i.e. in the rightward direction (direction of arrow) in FIGS. 4 and 5.

Accordingly, even if dry-cutting is performed, chips are efficiently disposed of. No chips remain and accumulate on the respective parts of the hobbing machine. Therefore, there arise no problems due to chips being caught among the sliding or operating parts of the hobbing machine, i.e. hindrance of normal operation, and degradation in machining precision resulting from thermal deformation due to heat of chips transmitted to the respective parts of the hobbing machine.

Figure 7:
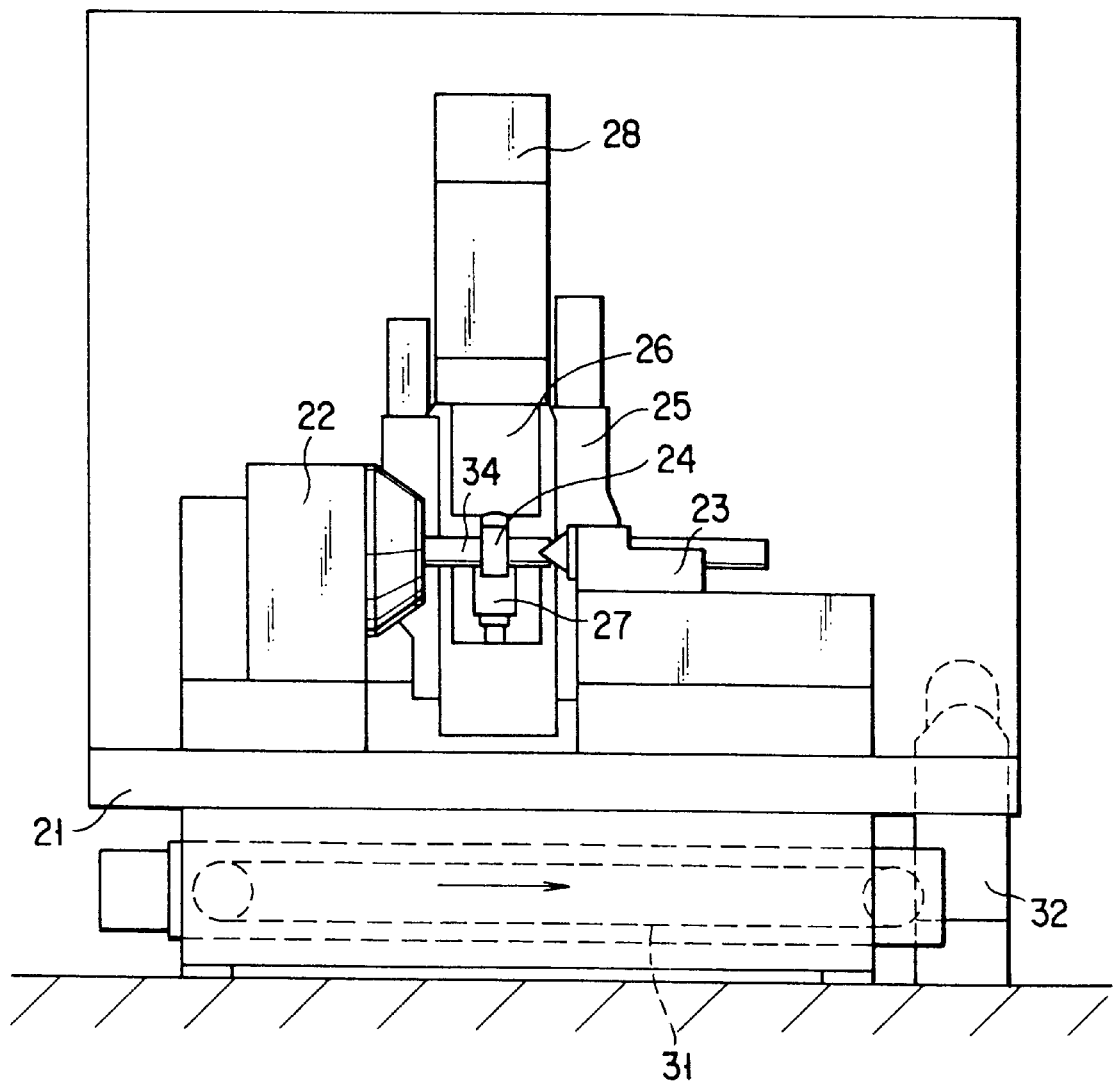
FIG. 7 is a front view of a horizontal hobbing machine according to a second embodiment of the present invention.
Figure 8:
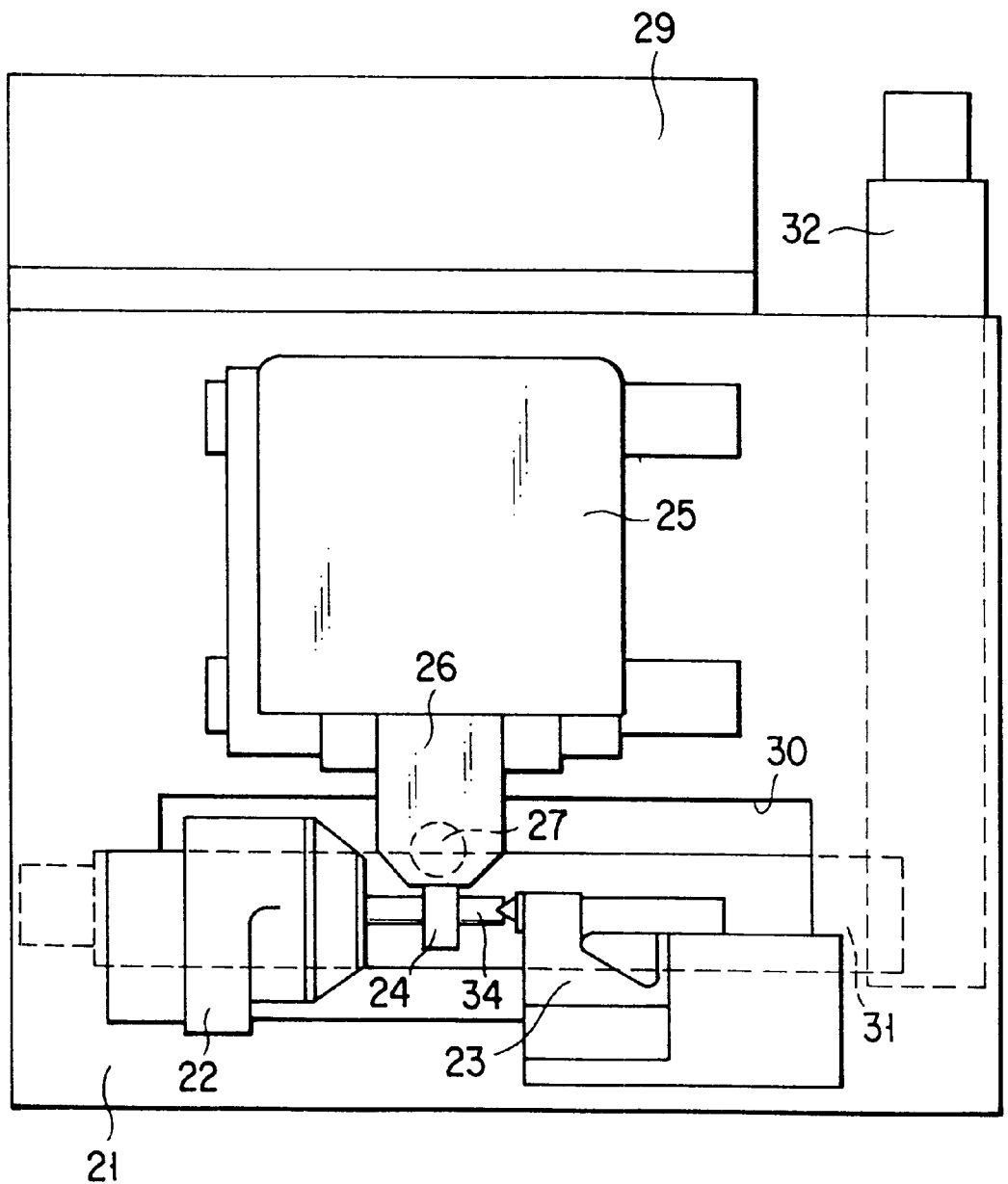
FIG. 8 is a plan view of the horizontal hobbing machine according to the second embodiment of the invention.
Figure 9:
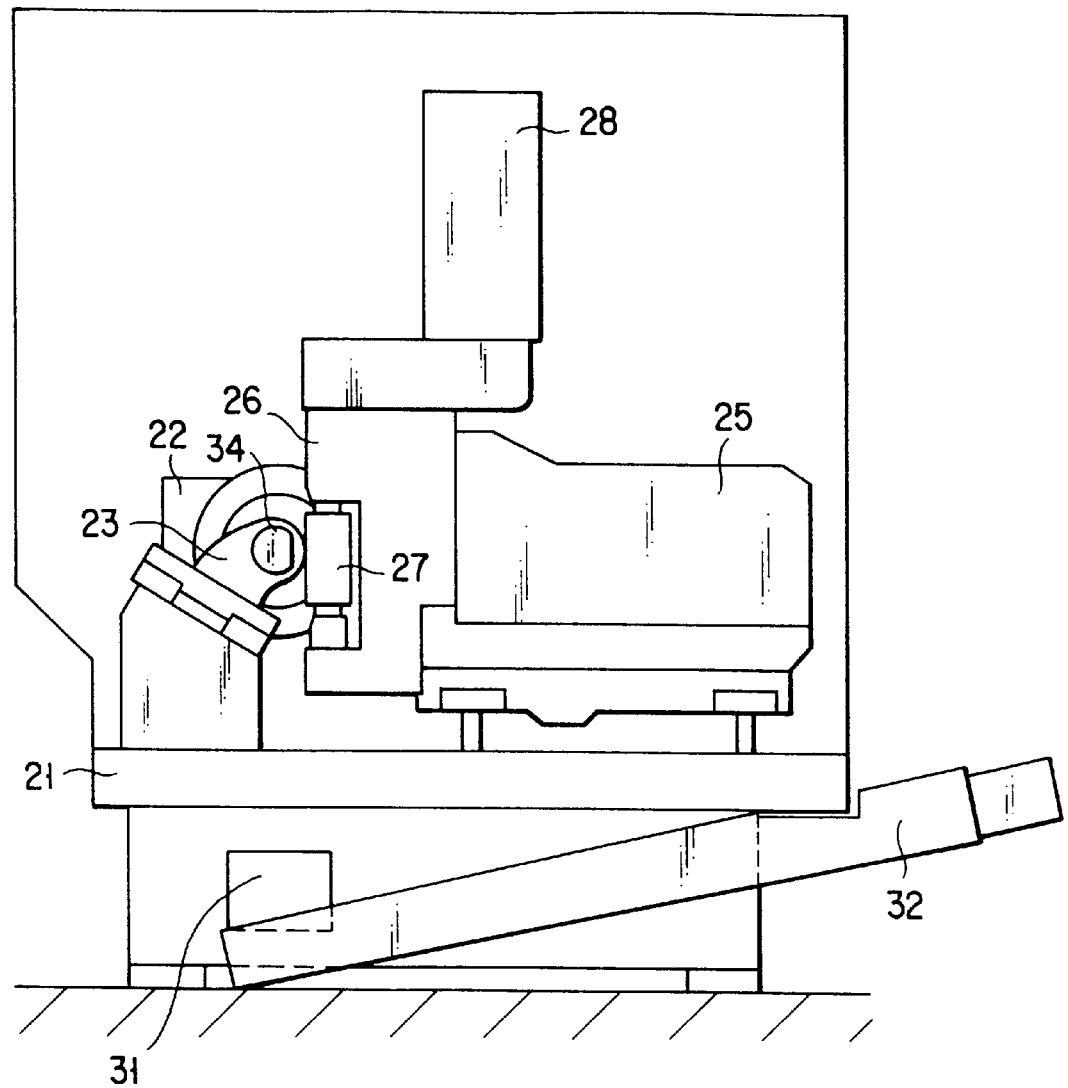
FIG. 9 is a side view of the horizontal hobbing machine according to the second embodiment of the invention.

A second embodiment of the invention will now be described with reference to FIGS. 7 to 9. In FIGS. 7 to 9, the elements common to those shown in FIGS. 4 to 6 are denoted by like reference numerals, and a description thereof is omitted.

In the second embodiment, an opening 30 is formed in the bed 21 in a region below the cutting unit where chips drop. A chip conveyor 31 is provided below the cutting unit including the opening 30. The chip conveyor 31 is moved in a direction along the rotational axis of the work piece 24 (the axis of the rotary shaft 34), i.e. in the rightward direction (direction of arrow) in FIGS. 7 and 8.

Another chip conveyor 32 is provided so as to be continuous with a terminal end portion of the chip conveyor 31. The chip conveyor 32 is moved in a direction (upward direction in FIG. 8; rightward direction in FIG. 9; indicated by an arrow) perpendicular to the rotational axis of the work piece 24 (the axis of the rotary shaft 34), that is, in the rearward direction of the present machine (horizontal hobbing machine: bed 21). The terminal end of conveyance of chip conveyor 31 and the beginning end of conveyance of chip conveyor 32 are positioned to spatially cross each other so that chips conveyed by the chip conveyor 31 may drop from the terminal end of conveyance of the conveyor 31 onto the chip conveyor 32. The terminal end of conveyance of chip conveyor 32 is located on the rear side of the present machine (horizontal hobbing machine: bed 21). A maintenance space is normally provided on the rear side of the machine (horizontal hobbing machine: bed 21).

In the horizontal hobbing machine of this embodiment having the above structure, chips produced by the cutting process drop onto the chip conveyor 31 from the opening 30 by their own weight and are conveyed by the conveyor 31 in the rightward direction in FIGS. 7 and 8 of the present machine (horizontal hobbing machine: bed 21). The chips conveyed by the chip conveyor 31 then drop onto the chip conveyor 32 at the terminal end of conveyance of the conveyor 31. The chips are conveyed by the conveyor 32 to the maintenance space on the rear side of the machine (horizontal hobbing machine: bed 21) and discharged out of the machine.

Accordingly, even if the dry-cutting is performed, the chips are efficiently disposed of. In addition, the chips are conveyed by the chip conveyors 31 and 32 to the maintenance space on the rear side of the machine (horizontal hobbing machine: bed 21), and maintenance is facilitated. Moreover, since the chips are discharged from the rear side of the machine (horizontal hobbing machine: bed 21), the horizontal hobbing machine can be laid out with less limitations and this is advantageous.

Figure 10:
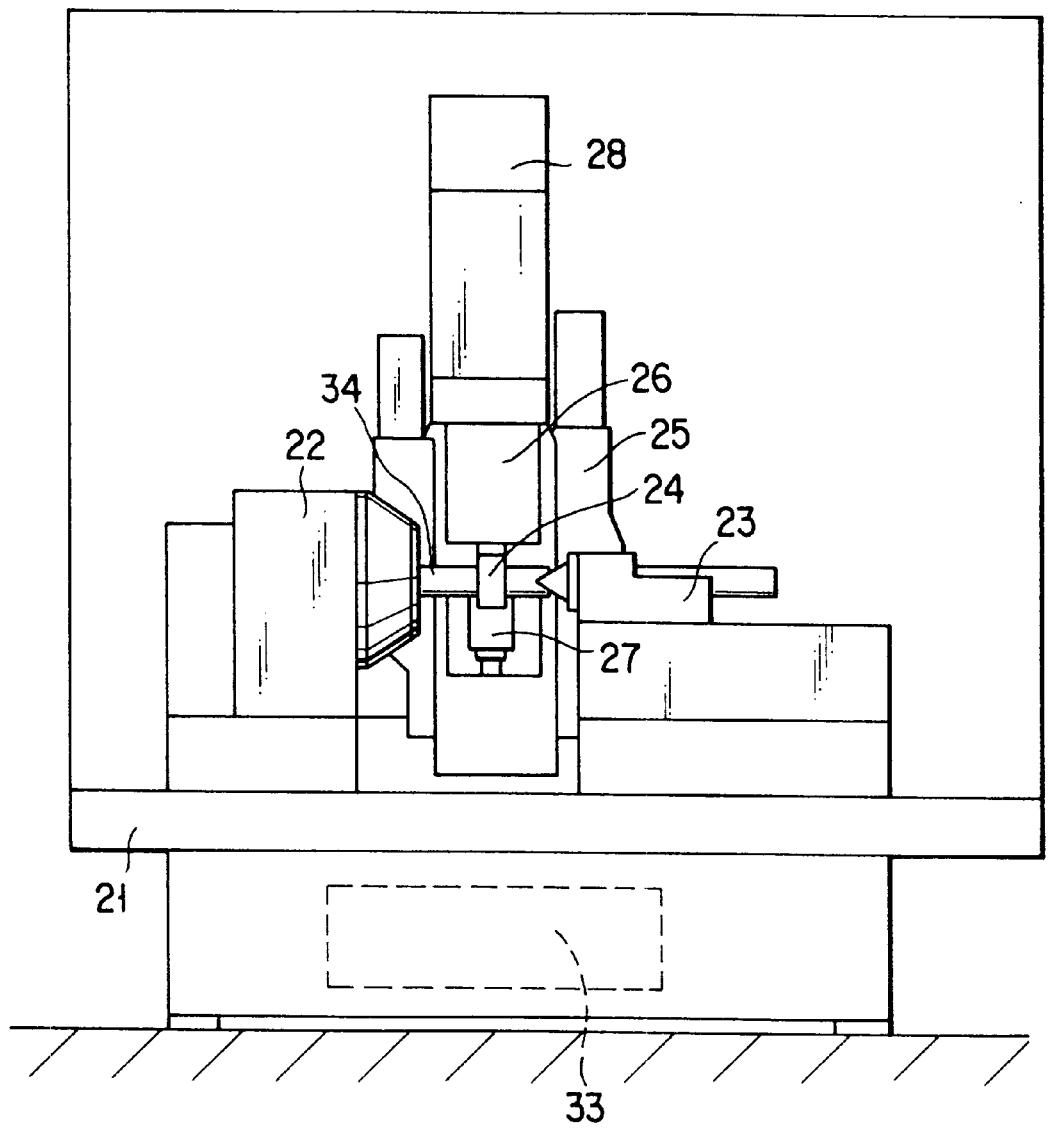
FIG. 10 is a front view of a horizontal hobbing machine according to a third embodiment of the present invention.
Figure 11:
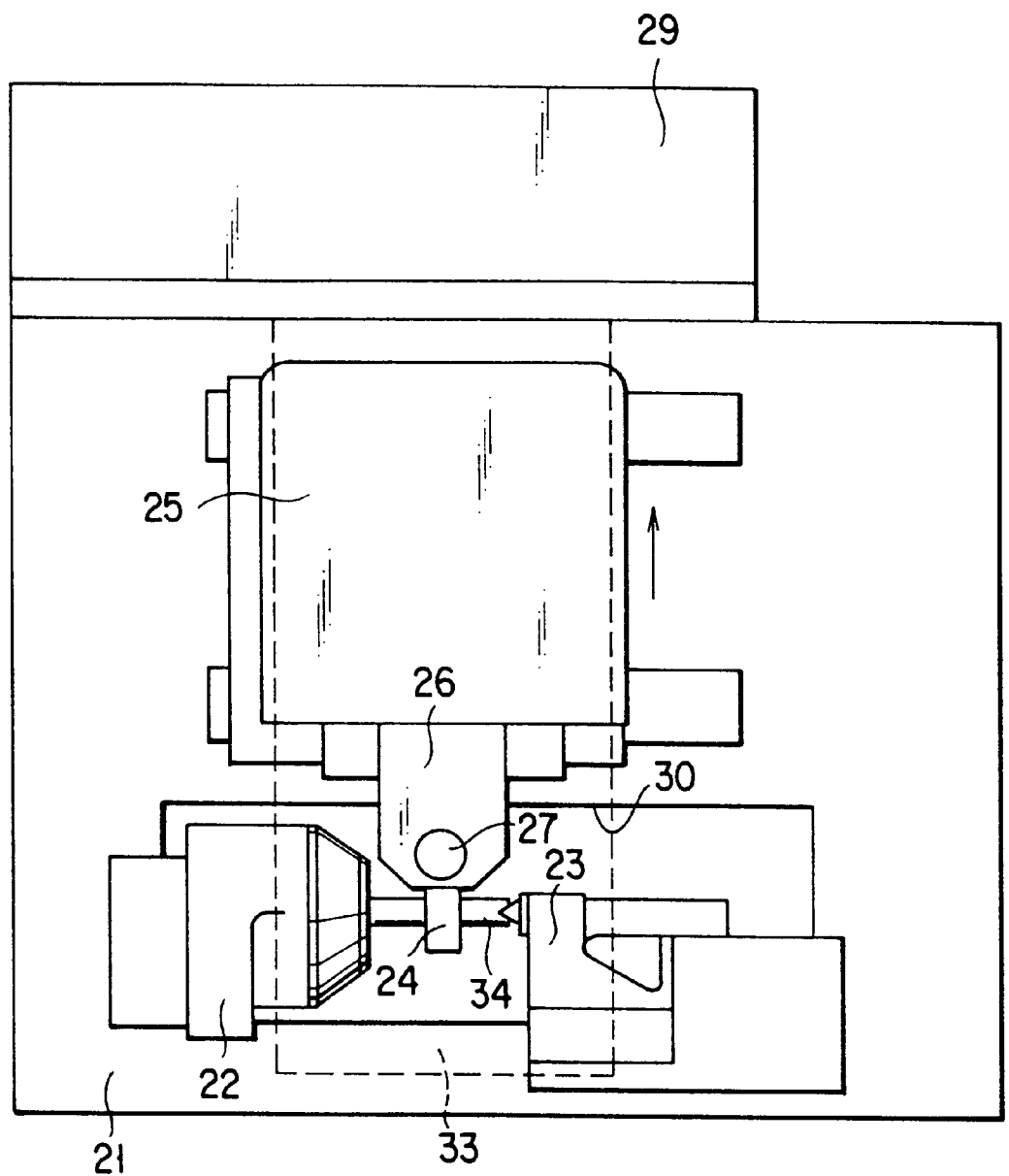
FIG. 11 is a plan view of the horizontal hobbing machine according to the third embodiment of the invention.
Figure 12:
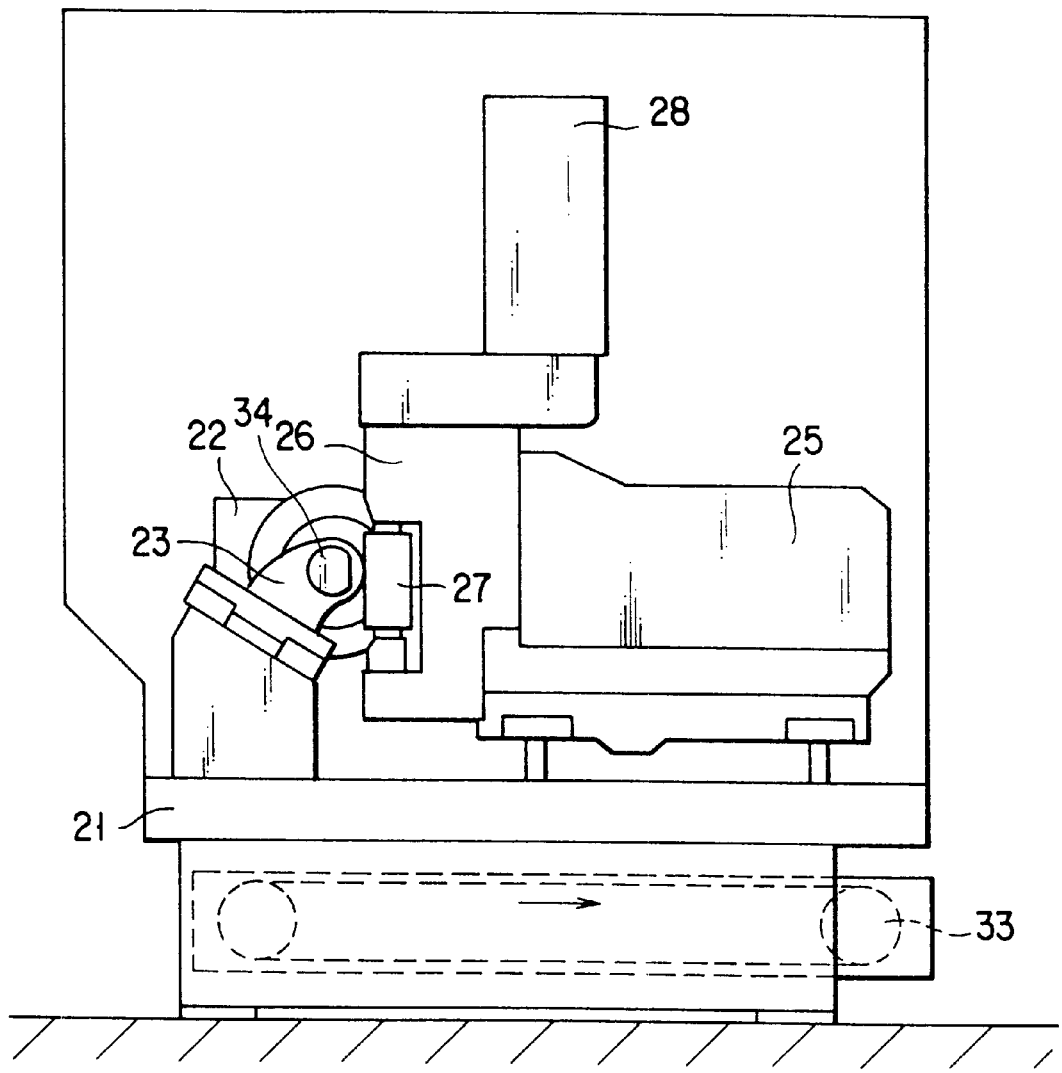
FIG. 12 is a side view of the horizontal hobbing machine according to the third embodiment of the invention.

A third embodiment of the invention will now be described with reference to FIGS. 10 to 12. In FIGS. 10 to 12, the elements common to those shown in FIGS. 4 to 9 are denoted by like reference numerals and a description thereof is omitted. An opening 30 is formed in the bed 21 in a region below the cutting unit where chips drop. A chip conveyor 33 is provided below the cutting unit including the opening 30. The chip conveyor 33 is moved in a direction (upward direction in FIG. 11; rightward direction in FIG. 12; indicated by an arrow) perpendicular to the rotational axis of the work piece 24 (the axis of the rotary shaft 34), that is, in the rearward direction of the present machine (horizontal hobbing machine: bed 21). The chip conveyor 33 is formed wide in the direction of the rotational axis of the work piece 24 (the axis of the rotary shaft 34) so as to cover the cutting unit. A maintenance space is normally provided on the rear side of the machine (horizontal hobbing machine: bed 21).

In the horizontal hobbing machine of this embodiment having the above structure, chips produced by the cutting process drop onto the chip conveyor 33 from the opening 30 by their own weight and are conveyed by the single conveyor 33 to the maintenance space on the rear side of the machine (horizontal hobbing machine: bed 21) and discharged out of the machine.

Accordingly, even if the dry-cutting is performed, the chips are efficiently disposed of. In addition, the chips are conveyed by the single chip conveyor 33 to the maintenance space on the rear side of the machine (horizontal hobbing machine: bed 21), and maintenance is facilitated. Moreover, since the chips are discharged from the rear side of the machine (horizontal hobbing machine: bed 21), the horizontal hobbing machine can be laid out with less limitations and this is advantageous.

As has been described above, according to the horizontal hobbing machine of this invention for cutting a tooth form on the work piece supported around a substantially horizontal central shaft, the conveyor for conveying chips is provided in a lower part of the machine (horizontal hobbing machine: bed 21) below the cutting section. Thus, even if the dry-cutting is performed, chips are discharged by the conveyor and efficiently disposed of.

Therefore, no chips remain and accumulate on the respective parts of the hobbing machine, and there arise no problems due to chips being caught among the sliding or operating parts of the hobbing machine, i.e. hindrance of normal operation, and degradation in machining precision resulting from thermal deformation due to heat of chips transmitted to the respective parts of the hobbing machine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A dry-cutting type horizontal hobbing machine comprising:

a bed;

a dry-cutting section provided on said bed and including at least a horizontal rotary shaft and a hob, said dry-cutting section generating a tooth form on a work piece supported around said rotary shaft by means of said hob, so as to perform dry cutting;

a conveyor provided in a lower part of said dry-cutting section below said bed, said conveyor having a direction of conveyance which is perpendicular to an axial direction of said rotary shaft; and an opening formed in said bed beneath said dry-cutting section through which cut chips drop from said dry-cutting section onto said conveyor, wherein said opening has a first opening dimension, in a direction along the axial direction of said shaft, which is larger than a second opening dimension, in a direction along the direction of conveyance of said conveyor.

2. A dry-cutting type horizontal hobbing machine comprising:

a bed;

a dry-cutting section provided on said bed and including at least a horizontal rotary shaft and a hob, said dry-cutting section generating a tooth form on a work piece supported around said rotary shaft by means of said hob, so as to perform dry cutting;

a belt conveyor for exhausting cut chips from the dry-cutting section, said belt conveyor being provided in a lower part of said dry-cutting section below said bed, and said belt conveyor having a direction of conveyance which is perpendicular to an axial direction of said rotary shaft and wherein said belt conveyor is a first conveyor and further comprising a second conveyor for receiving cut chips from said first conveyor and for further conveying the cut chips in a direction parallel to the axial direction of said shaft.

3. A dry-cutting type horizontal hobbing machine comprising:

a bed;

a dry-cutting section provided on said bed and including at least a horizontal rotary shaft and a hob, said dry-cutting section generating a tooth form on a work piece supported around said rotary shaft by means of said hob, so as to perform dry cutting;

a belt conveyor for exhausting cut chips from the dry-cutting section, said belt conveyor being provided in a lower part of said dry-cutting section below said bed, and said belt conveyor having a direction of conveyance which is perpendicular to an axial direction of said rotary shaft; and an opening formed in said bed beneath said dry-cutting section through which cut chips drop from said dry-cutting section onto said conveyor, wherein said opening has a first opening dimension, in a direction along the axial direction of said shaft, which is larger than a second opening dimension, in a direction along the direction of conveyance of said conveyor.

4. The dry-cutting type horizontal hobbing machine according to claim 1, wherein said conveyor is a first conveyor and further comprising:

a second conveyor for receiving cut chips from said first conveyor and for further conveying the cut chip in a direction parallel to the axial direction of said shaft.

5. The dry-cutting type horizontal hobbing machine according to claim 4, wherein said second conveyor is a belt conveyor.

6. The dry-cutting type horizontal hobbing machine according to claim 2, wherein said second conveyor is a belt conveyor.

7. The dry-cutting type horizontal hobbing machine according to claim 3, wherein said belt conveyor is a first conveyor and further comprising:

a second conveyor a second conveyor for receiving cut chips from said first conveyor and for further conveying the cut chip in a direction parallel to the axial direction of said shaft.

8. The dry-cutting type horizontal hobbing machine according to claim 7, wherein said second conveyor is a belt conveyor.

* * * * *